INVENTORS:
TIBOR E. TALLIAN
LEWIS B. SIBLEY

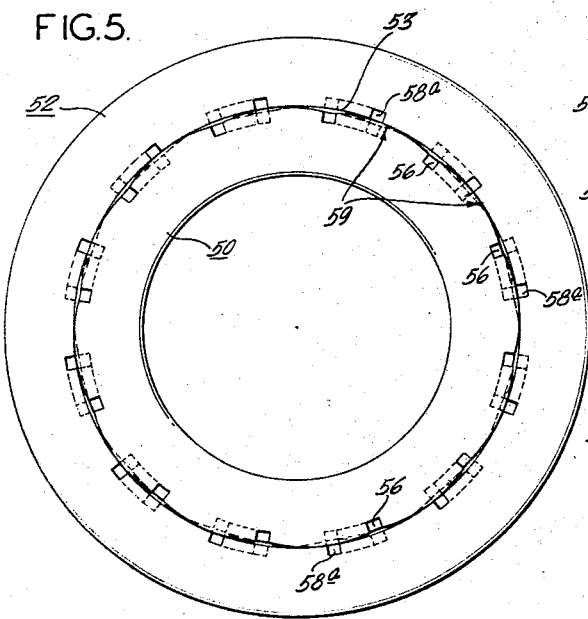
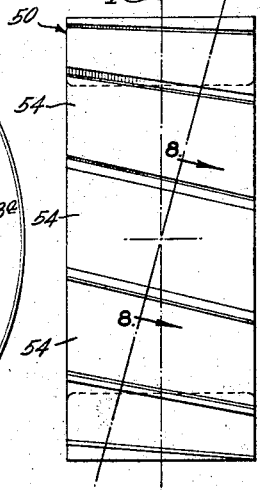
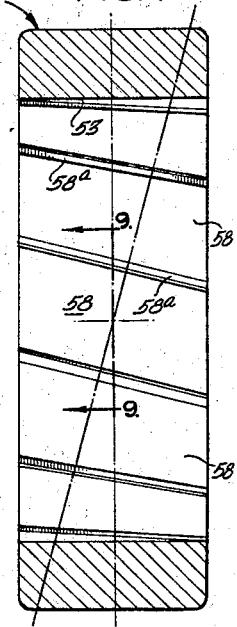
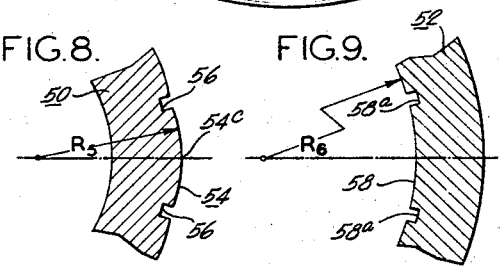
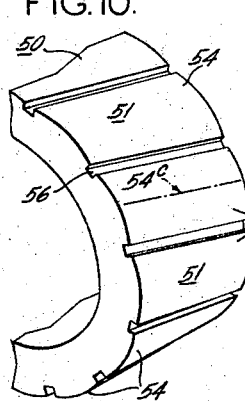
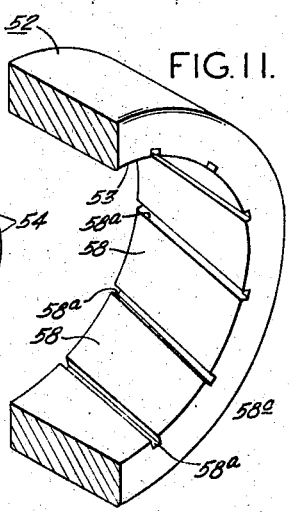
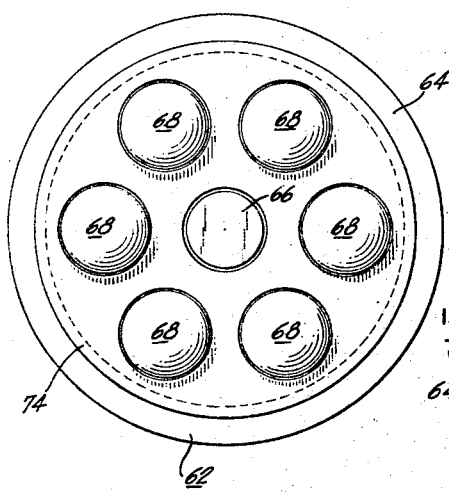
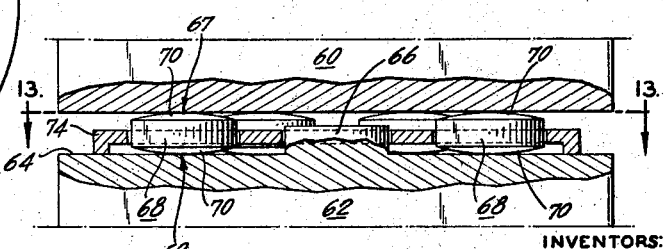
INVENTORS:
TIBOR E. TALLIAN
LEWIS B. SIBLEY

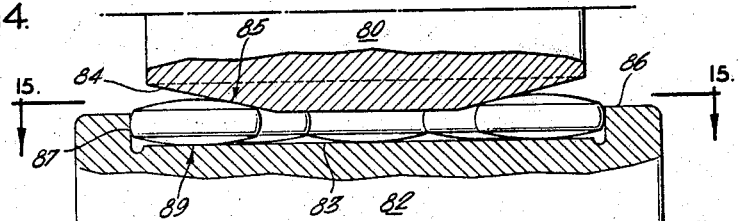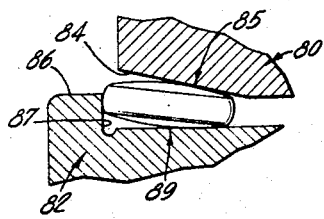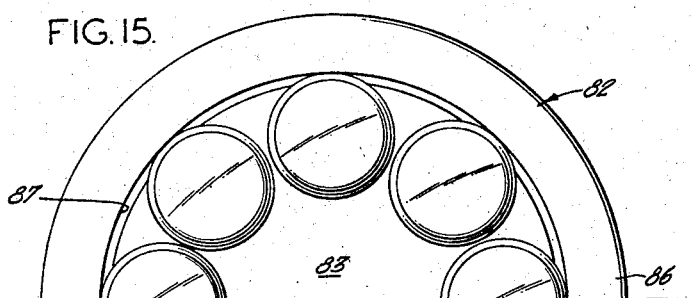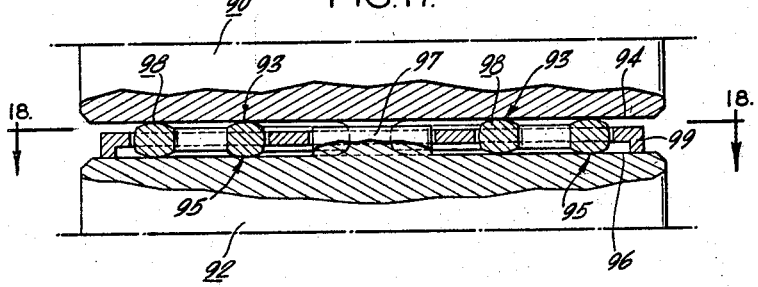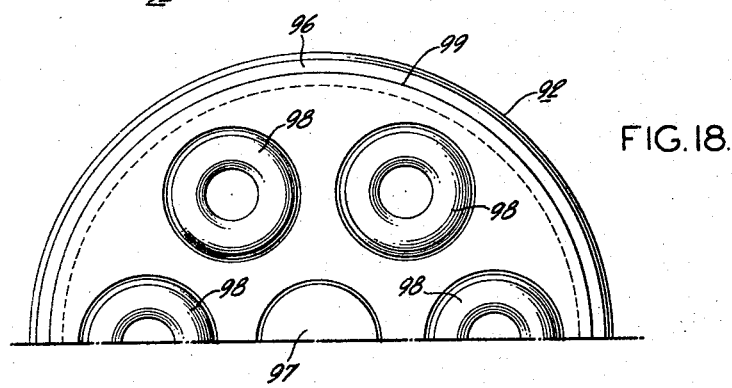

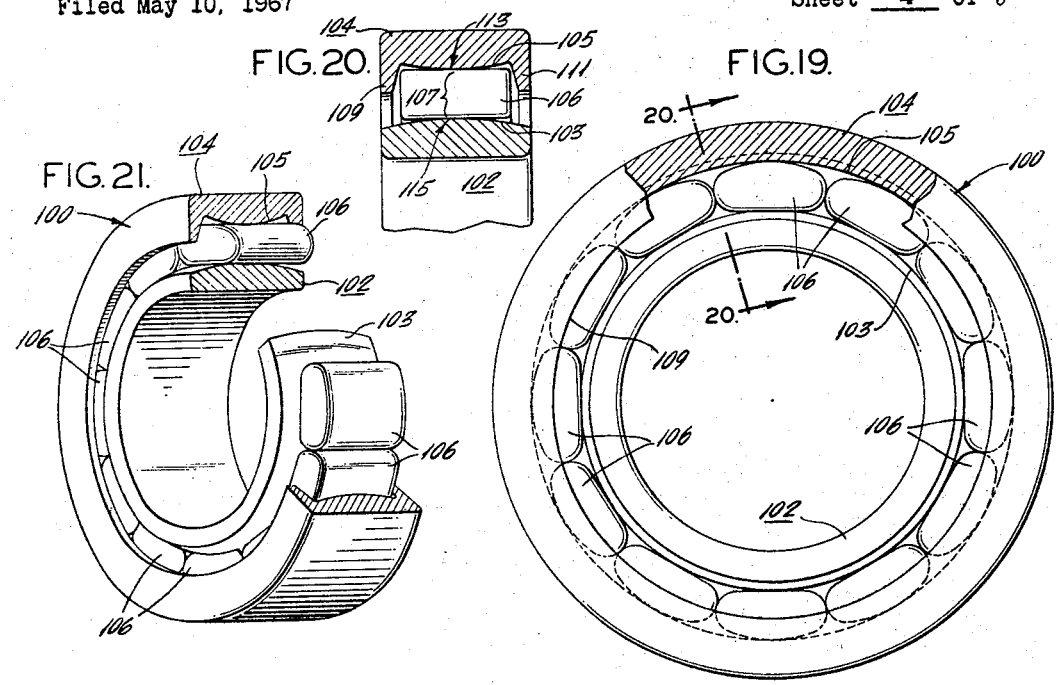
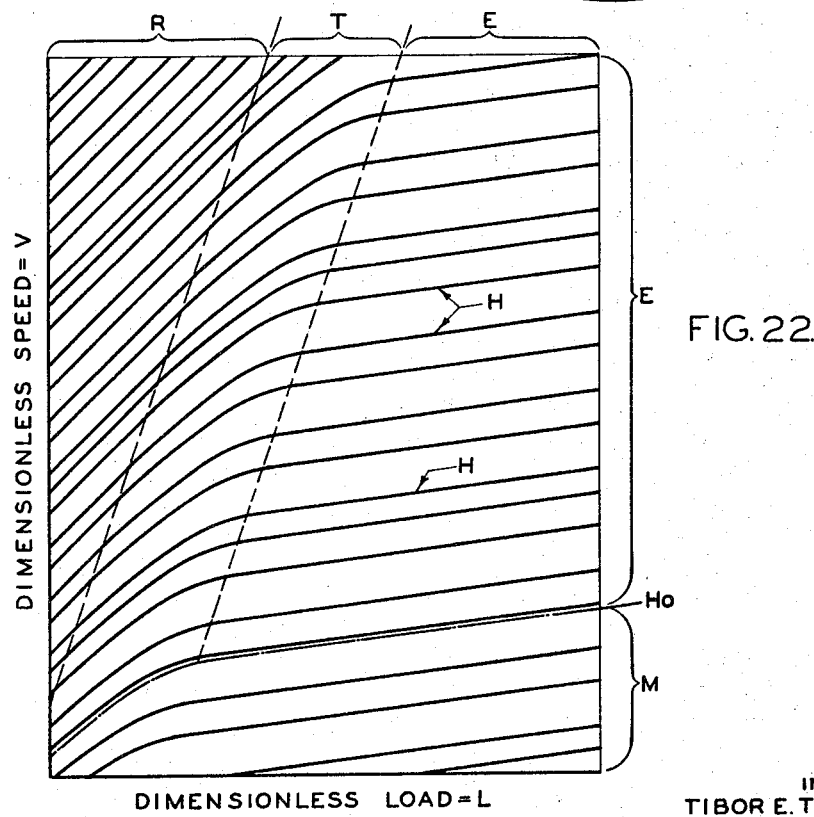

United States Patent Office 3,421,799
Patented Jan. 14, 1969

3,421,799
ELASTOHYDRODYNAMIC SLIDING BEARINGS
Tibor E. Tallian, Paoli, and Lewis B. Sibley, Wayne, Pa., assignors to SKF Industries, Inc., King of Prussia, Pa., a corporation of Delaware
Continuation-in-part of application Ser. No. 457,913, May 24, 1965. This application May 10, 1967, Ser. No. 649,762
U.S. Cl. 308—121      8 Claims
Int. Cl. B61f 17/14; F16c 33/66; F16c 1/24

ABSTRACT OF THE DISCLOSURE

An elastohydrodynamic sliding bearing comprising first and second relatively movable members having intercontacting bearing surfaces. The movable members may comprise inner and outer rings, the outer ring having a generally cylindrical inner bearing surface and the inner ring bearing surface being formed with a plurality of circumferentially spaced, radially outward arcuate projections which may be in the form of spherical or otherwise convex segments. A lubricant is provided between the bearing surfaces so that when the rings are rotated relative to one another while being in pressure-applying relation, a load-carrying uninterrupted elastohydrodynamic film is formed for a predetermined range of entrainment velocities of the members moving through the contact zones and for a predetermined range of loads and contact curvatures. It has been found that ranges of variables to produce an elastohydrodynamic film are given approximately by the following inequalities:

$$\frac{G^{1.6}V^{0.7}}{L^{0.13}} \gtrless 1.5 \frac{\sigma}{R_c} \frac{V}{L^2 G^{1.7}} \lessgtr 10^7$$

where G is the material parameter, V is the entrainment velocity, L is load, $R_c$ is the equivalent radius of the contacting surfaces and $\sigma$ is the surface roughness of the surfaces in contact.

---

This is a continuation-in-part application of my prior copending application Ser. No. 457,913, filed May 24, 1965, now abandoned, for "Elastohydrodynamic Sliding Bearings."

The present invention relates to bearings and more particularly to a new and improved type of bearing designated as an "elastohydrodynamic, variable viscosity sliding bearing."

In order to highlight the principle of operation of the elastohydrodynamic sliding bearing of the present invention and its advantages over conventional bearings, it is considered desirable to discuss briefly the principle of operation and other factors such as load-carrying capacity, accuracy, lubricant requirements and friction, wear and fatigue characteristics of conventional bearings. For purposes of this discussion, bearings may be classified broadly in three main divisions; that is, hydrodynamic sliding bearings, rolling bearings, and hydrostatic sliding bearings.

In the operation of conventional hydrodynamic sliding bearings, the bearing surfaces of the bearing members sliding on each other are rigid and the lubricant in the form of a film between the bearing surfaces, which is under hydrodynamic pressure generated by the motion of the bearing itself, serves to support the bearing surfaces in spaced relation to permit relative movement of the bearing members without wear. In hydrostatic fluid film bearings, the confronting surfaces of the bearing members are maintained in spaced relation by a fluid lubricant pressurized hydrostatically, from an outside source.

In rolling bearings, the bearing surfaces rolling on each other are elastic, and the lubricant is often present in the form of a film between the bearing surfaces. This film is under hydrodynamic pressure generated by the motion of the bearing itself. The hydrodynamic pressure is balanced by the elastic pressures arising from elastic deflection of the bearing surfaces. This interaction of hydrodynamic and elastic pressures is called an elastohydrodynamic condition.

The conventional hydrodynamic sliding bearing which may be characterized as a rigid isoviscous sliding device is in one simple form, a stationary sleeve which is used to support a rotatable member such as a shaft in a stationary housing. These sleeve bearings are generally employed in applications where radial space is an important factor since this type of bearing usually requires less radial space than many types of rolling bearings. Conventionally, a lubricant is provided between the interengaging cylindrical surfaces of the sleeve and shaft whereby upon relative rotation of the bearing surfaces, the hydrodynamic lubricant pressure builds up to support the shaft. In this type of bearing, there is a comparatively large contact area between the interengaging cylindrical bearing surfaces whereby the unit pressure is low and therefore, there is a comparatively small lubricant film pressure. Hence a relatively small supporting force or lifting force is provided by a given area of the lubricant film.

This type of bearing provides an accurate support at low loads and high speeds. However, as the load is increased, the film thickness drops and inaccurate shaft support results. Also, due to imperfections in the contacting bearing surfaces such as waviness, eccentricity and surface roughness, at high loads or under shock loading conditions, the lubricant film breaks down and the imperfections rub or engage, thereby resulting in wear and possible breakdown of the bearing. In this type of bearing the limited accuracies available in the large rigid bearing surfaces require relatively high values of film thickness to prevent rubbing of imperfections. However, the disadvantage of a thick film is that it requires great quantities of lubricant and as the film thickness varies in a varaible speed and variable load application, the alignment accuracy of the supported members such as the shaft is affected. In terms of friction, hydrodynamic sliding bearing friction is low at medium speeds and high at high speeds and at zero speed. There is high wear at low speeds and substantially no wear at high speeds. The hydrodynamic sliding bearing does not show appreciable fatigue.

Rolling bearings, which may be characterized as elastic variable-viscosity rolling devices, typically comprise inner and outer rings which are spaced apart to define an annular space for a plurality of rolling elements, either balls or rollers. These bearings require somewhat more radial space than hydrodynamic sliding types but much less axial space. They require small quantities of lubricant and the friction and wear factors are low over a wide speed range. However, the bearings eventually fail in fatigue. Rolling bearings provide extremely accurate support at low to medium loads and any speed. In these bearings, the total contact area between the balls or rollers and the rings is comparatively small and the unit pressures are extremely high and therefore, load-carrying capacity is limited by the ability of the bearing material to withstand high stress without premature fatigue.

The elastohydrodynamic films in rolling bearings are extremely thin, and their thickness varies very little with load due to the property of the lubricants used that their viscosity increases greatly under the high pressures in the contact areas of rolling bearing enabling the lubricant to carry high loads per unit area. The accuracy of a rolling bearing is limited under very high loads by the elastic deflections of the bearing surfaces at the small contact areas. In rolling bearings, the load-carrying capacity of a given bearing could be increased by enlarging the contact area between the rolling elements and the rings. However, the obvious limitation here is that as the size of the rolling elements is increased to increase the contact area, the size of the bearing increases and the wasted space between the rollers also increases.

In the third category, that is, the hydrostatic sliding bearings, the rotating shaft is supported or floated on a body of pressurized fluid lubricant, either gaseous or liquid. This arrangement requires a comparatively complicated and expensive lubricant feed system for the assembly. Furthermore, it is clear that difficulties in the lubricant feed system can prevent suitable operation of the bearing. The hydrostatic bearings are also rigid isoviscous sliding devices, and the limitations of accuracy in case of high or shock loads as well as high friction at high speed noted for hydrodynamic bearings apply to them also.

It has been found that if the confronting surfaces of a pair of bearing elements are of a given configuration to define a concentrated contact zone of a given geometry at a predetermined load and at a predetermined relative sliding movement of the bearing surfaces, that an uninterrupted load-carrying elastohydrodynamic film forms in the area of the contact zones to support the surfaces for optimum relative movement and the material of the bearing surfaces elastically deforms in the contact zones so that only a film thickness greater than the combined imperfections of the bearing surfaces need be provided to support the members for relative movement. Further, it has been found that in a bearing in accordance with the present invention, the accuracy of shaft positioning varies little over a wide load range; that is, the thickness of the elastohydrodynamic film remains substantially uniform regardless of load and thus, is insensitive to impact loading and provides extremely accurate support. For example, in accordance with one of the forms of elastohydrodynamic sliding bearing of the present invention, the bearing comprises an outer ring having a generally cylindrical inner surface and an inner ring or shaft having a plurality of circumferentially spaced, outwardly directed arcuate projections in the form of spherical or convex protrusions which contact the bearing surface of the outer ring at a plurality of contact zones. In this bearing assembly, when load is applied, the contact points (zones) elastically deform into relatively small, but distinct, contact areas so that when a lubricant is interposed between the contact areas and the rings are rotated relative to one another within a predetermined range of velocities, an uninterrupted load-carrying elastohydrodynamic film is formed at all of the contact areas providing a fluid film-supported bearing.

The elastohydrodynamic sliding bearing of the present invention has advantages over conventional rolling bearing assemblies. The sliding bearing of the present invention has a greater load-carrying capacity for a given overall size because the contact conformity or osculation is outstanding or high in all planes. The sliding bearing of the present invention is more campact radially than rolling bearing assemblies by reason of the fact that the rolling elements are eliminated, can be more simplified since no rolling elements and—in several embodiments—no cage is necessary and is also more economical to manufacture by reason of the fact that it has less parts, that is, no rolling elements, and in several embodiments, no cage.

In comparison with hydrodynamic bearings, the elastohydrodynamic bearing of the present invention requires much less lubricant, wears less at low speeds, has greater load-carrying capacity, is more accurate at all speeds and loads, and is more compact axially.

The elastohydrodynamic sliding bearings of the present invention has several advantages over hydrostatic bearings. For example, in hydrostatic bearings, the rotating elements of the bearing assembly are supported or floated on a body of pressurized fluid lubricant, either gaseous or liquid, and this requires a comparatively complicated and expensive lubricant feed system. No such pressurized lubricant supply is needed in the bearing of the present invention. The advantages of axial compactness and load independent accuracy listed in comparison with hydrodynamic sliding bearings also apply here.

The elastohydrodynamic sliding bearing of the present invention provides for load independent rigid shaft positioning due to thin films and high conformities at the contact areas and has a greater load-carrying capacity for a given size as compared to fluid film bearings because of the virtual independence of film thickness from load and for the same reason is insensitive to impact loading.

The elastohydrodynamic sliding bearing has longer fatigue life under a given load than a rolling bearing of the same size because the pressures on the bearing material in the contacts will be lower due to the better conformity. The sliding bearing of the present invention has high accuracy of shaft positioning at all loads because contact deformations are small and the elastohydrodynamic supporting film is very thin. Moreover, in the elastohydrodynamic sliding bearing of the present invention, the lubricant requirement is small and thus the entire bearing assembly may often be lubricated for life at assembly, it being noted that in these cases there is no external lubricant supply problem in bearing assemblies made in accordance with the present invention. Furthermore, the elastohydrodynamic sliding bearing of the present invention can be made in embodiments suitable for carrying radial and thrust loads.

With the foregoing in mind, an object of the present invention is to provide a new type of elastohydrodynamic sliding bearing which is characterized by novel features of construction and arrangement, providing high load-carrying capacity and good resistance to fatigue.

Another object of the present invention is to provide an elastohydrodynamic sliding bearing assembly which is of comparatively simple construction and which is easy and economical to manufacture.

Still another object of the present invention is to provide an elastohydrodynamic sliding bearing which is adapted for accurate support of parts in high precision applications.

These and other objects of the present invention and the various features and details of a bearing assembly constructed in accordance with the present invention are hereinafter more fully set forth with reference to the accompanying drawings, wherein:

FIG. 5 is a side elevational view of a third embodiment of elastohydrodynamic sliding bearing in accordance with tht present invention;

FIG. 6 is an end view of the inner ring of the sliding bearing shown in FIG. 5;

FIG. 7 is a transverse sectional view of the outer ring of the sliding bearing of FIG. 5;

Figure 24:
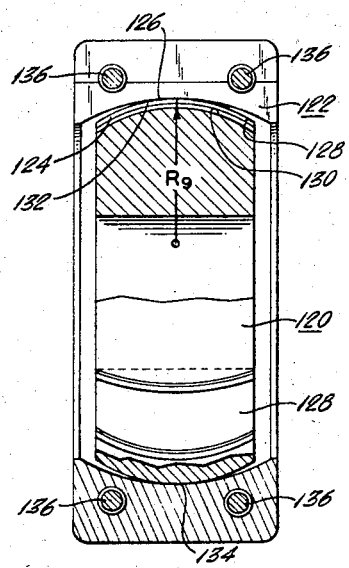
Figure 23:
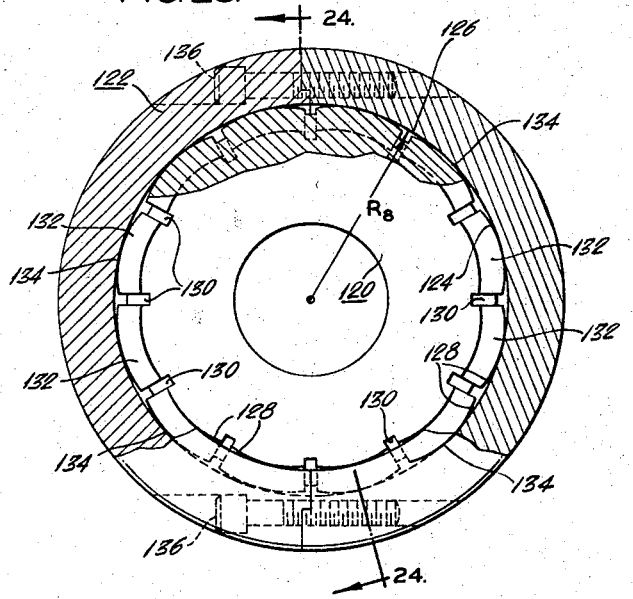
Figure 25:
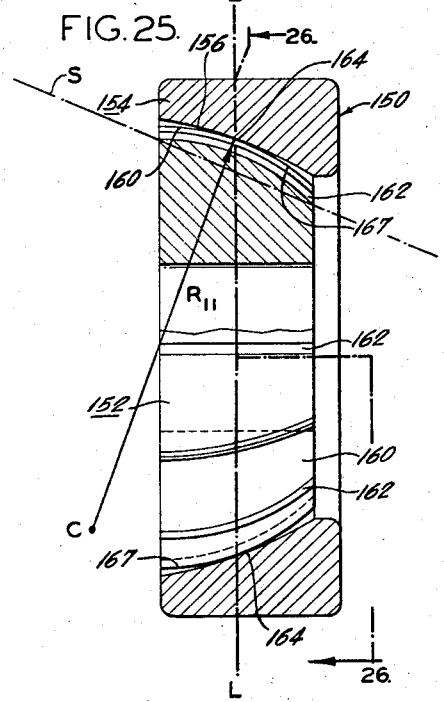
Figure 26:
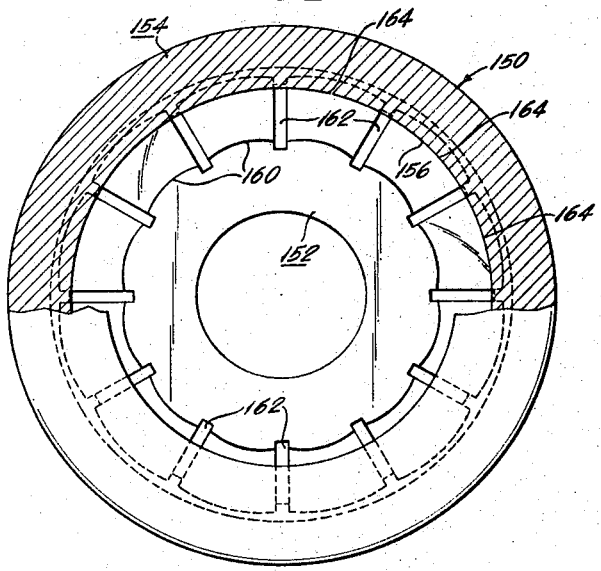

FIGS. 8 and 9 are fragmentary sectional views taken on lines 8—8 and 9—9 of FIGS. 6 and 7 respectively;

FIGS. 10 and 11 are fragmentary perspective views of the inner and outer rings of the bearing of FIG. 5;

FIG. 12 is a fragmentary view with parts broken away of a fourth embodiment of elastohydrodynamic sliding bearing in accordance with the present invention;

FIG. 13 is a view taken on lines 13—13 of FIG. 12;

FIG. 14 is a fragmentary view with parts broken away of a fifth embodiment of elastohydrodynamic sliding bearing in accordance with the present invention;

FIG. 15 is a view taken on lines 15—15 of FIG. 14;

FIG. 16 is an enlarged fragmentary sectional view of one of the slug members of the bearing of FIG. 14;

FIG. 17 is a fragmentary view with parts broken away of a sixth embodiment of elastohydrodynamic sliding bearing in accordance with the present invention;

FIG. 18 is a view taken on lines 18—18 of FIG. 17;

FIG. 19 is a side elevational view with parts broken away of a seventh embodiment of sliding bearing in accordance with the present invention;

FIG. 20 is an enlarged sectional view taken on lines 20—20 of FIG. 19;

FIG. 21 is a fragmentary perspective view of the bearing shown in FIG. 19;

FIG. 22 is a chart of dimensionless load versus dimensionless speed with a series of lines representing film thickness for given lubricants;

FIG. 23 is a side elevational view partly in section of an eighth embodiment of elastohydrodynamic sliding bearing in accordance with the present invention;

FIG. 24 is a sectional view taken on lines 24—24 of FIG. 23;

FIG. 25 is a view of a ninth embodiment of elastohydrodynamic sliding bearing in accordance with the present invention; and FIG. 26 is a view taken on lines 26—26 of FIG. 25.

The elastohydrodynamic sliding bearing of the present invention comprises in broad terms first and second relatively movable members having confronting bearing surfaces with at least one of the bearing surfaces having a plurality of arcuate sections defining contact zones with the bearing surface of the other member whereby when the members are moved relative to one another at a predetermined rate while they are in a predetermined pressure-applying relation, an uninterrupted elastohydrodynamic film is formd between the bearing members at the contact zones providing a fluid film-supported sliding bearing. More specifically and with reference to the enclosed chart wherein load is plotted against rate of relative movement of the sliding bearing surfaces, the elastohydrodynamic film forms in the elastic region marked E at a given load range and range of movement relationship within that region whereby the minimum film thickness required to support the members may be very small as long as it is greater than the combined imperfections of the members at the contact zones and remains substantially constant even as load is increased considerably, so that for all practical purposes, the film thickness is insensitive to load.

Figure 1:
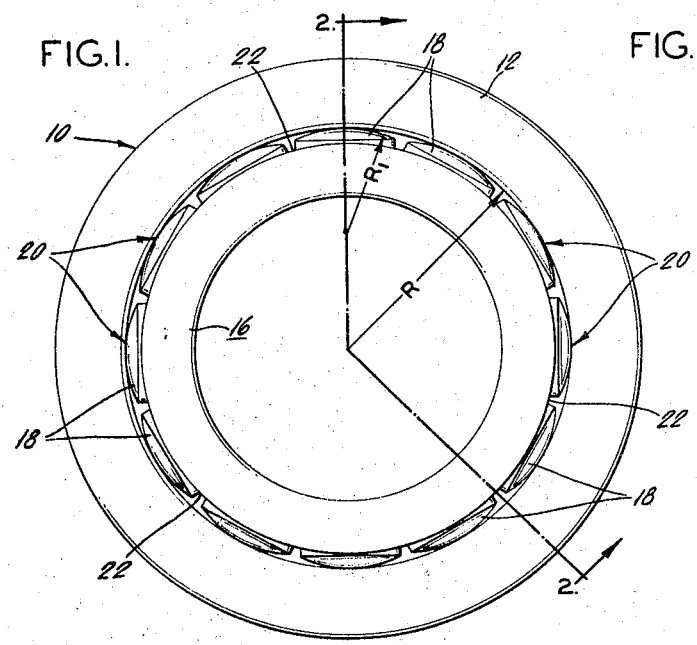
FIG. 1 is a side elevational view of an elastohydrodynamic sliding bearing in accordance with the present invention.
Figure 2:
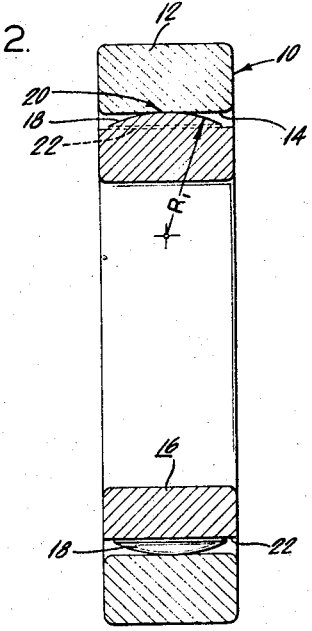
FIG. 2 is a sectional view taken on lines 2—2 of FIG. 1.

Considering now more specifically the present invention, and with reference to FIGS. 1 and 2 thereof, there is illustrated an elastohydrodynamic sliding bearing assembly constructed in accordance with the present invention. This bearing assembly is generally designated by the numeral 10 and comprises an outer ring 12 having a generally cylindrical inner bearing surface 14 and an inner ring 16 having a bearing surface confronting the bearing surface 14.

In the present instance, the bearing surface 17 is formed with a plurality of circumferentially spaced, radially outwardly directed arcuate projections 18 which, as illustrated, are in the form of spherical or otherwise convex segments circumferentially separated by axially extending grooves 22. The segments 18 confront the inner bearing surface 14 of the outer ring and provide a plurality of circumferentially spaced contact areas or zones 20 between the rings. The radius (or radii) of curvature $R_1$ of the segments 18 is (are) small enough so that the pressure at the contact areas 20 is sufficiently large so that the lubricant film developed between the inner and outer rings at the contact zones is elastohydrodynamic. The radius of curvature $R_1$ at the apex of each of the arcuate projections 18 is less than the radius R of the bearing surface 14. By this arrangement, it has been found that when the rings are rotating relative to one another above a predetermined velocity and in a predetermined load range, the contact points 18 deform into small, but distinct contact areas and a load-carrying elastohydrodynamic film forms between the bearing surface 14 and in contact zones 20 which support the inner and outer rings for rotating relative to one another.

By way of illustration, the chart shown in FIG. 22 is a plot applicable for a given contact material and lubricant, as defined by a given value of the material parameter $G = \delta E^1$, where $\delta$ is the viscosity pressure exponent of the lubricant in the equation $\mu = \mu_0 \epsilon_p{}^p$ with $\epsilon$ the basis of natural logarithms, $p$ pressure and $\mu$ and $\mu_0$ absolute viscosities at pressure $p$ and atmosphere, respectively. $E^1$ is the reduced modulus of elasticity defined below. The chart gives dimensionless load versus dimensionless speed for elastohydrodynamic bearings and is divided into four zones, rigid R, transitional T, elastic E and mixed-lubricated M and shows a series of lines H designating dimensionless film thickness. In the rigid zone, the bearing surfaces are relatively rigid, since the hydrodynamic fluid film pressures are relatively small, and in the elastic zone the bearing surfaces are elastically deformed and lubricant viscosity is increased in the contact zone since the elastohydrodynamic fluid film pressures are relatively high. In the transitional zone T lubricant viscosity is increased, but elastic deformation is negligible. In the mixed-lubricant zone M film thickness does not suffice to separate all surface asperities and therefore only an incomplete film exists at the contact zone. The bearing according to this invention is intended to operate in the elastic zone but may, in many cases be safely operated in any of the other zones shown on the chart.

In the chart, dimensionless entrainment velocity is defined as:

$$V = \frac{\mu U}{E^1 R_c}$$

where $\mu$ equals viscosity of the lubricant at the contact inlet, U equals relative entrainment velocity of contact surfaces and is further defined as $$U = \frac{V_1 + V_2}{2}$$

where $V_1$ and $V_2$ are the linear velocities of the surfaces in contact with reference to such contact, $E^1$ equals reduced modulus of elasticity defined as $$1/E^1 = 1/2 \left( \frac{1 - V_1^2}{E_1} + \frac{1 - V_2^2}{E_2} \right)$$

with $V_1$, $V_2$ and $E_1$, $E_2$ the Poisson's ratio and Young's modulus of the two contacting bodies, and $R_c$ is the equivalent radius of the contacting surface defined as $$\frac{1}{R_c} = \frac{1}{R_1} + \frac{1}{R_2}$$

with $R_1$, $R_2$ the radii of (equivalent) cylindrical surfaces in contact. Dimensionless load is expressed by the equation, $$L = \frac{w}{E^1 R_c}$$

Dimensionless load is expressed by the equation, $$L = \frac{w}{E^1 R}$$

where $w$ is load. Film thickness is expressed by $$H = \frac{h_o}{R}$$

where $h_o$ is minimum film thickness. As shown in the chart, the elastohydrodynamic film forms in the elastic region at a given load range and speed range relationship and the minimum elastohydrodynamic film thickness required to support the members may be very small as long as it is greater than the combined surface imperfections of the members at the contact zones, and remains substantially constant even as load is increased so that for all practical purposes, the film thickness is insensitive to load. The minimum film thickness required to support the members is designated on the chart by the line $H_o$. It is noted that this line will vary on the chart depending on the characteristics of the contact surfaces at the contact zones.

In arranging for a bearing according to this invention to function as an elastohydrodynamic bearing, it is necessary that the lubricant film thickness ($h_0$) be sufficient by comparison to the composite surface roughness defined as $$\sigma = (\sigma_1^2 + \sigma_2^2)^{1/2}$$

where $\sigma_1$, $\sigma_2$ are the rms surface roughness of the two surfaces in contact. This is accomplished by satisfying the Formula 1 below; in which all quantities are substituted in compatible units of measurement $$\frac{G^{1.6}V^{0.7}}{L^{0.13}} \geq 1.5 \frac{\sigma}{R_c} \quad (1)$$

The benefits claimed for the bearing according to this invention are fully realized when it operates in the elastic region E of chart 22. This is accomplished by satisfying, in addition to Formula 1, also Formula 2 below, in which all quantities are substituted in compatible units of measurement $$\frac{v}{L^2 G^{1.7}} \leq 10^7 \quad (2)$$

However, the bearing in this invention can, in general, satisfactorily be operated in regions other than the elastic region E, and will, as a result of temporary changes in load, speed, viscosity and other operating parameters, at times operate in these other regions.

Figure 3:
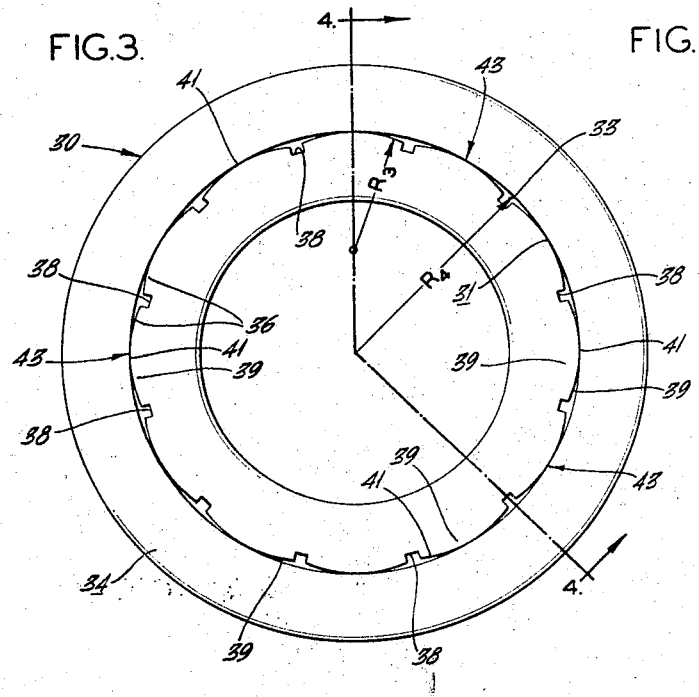
FIG. 3 is a side elevational view of a second embodiment of elastohydrodynamic sliding bearing in accordance with the present invention.
Figure 4:
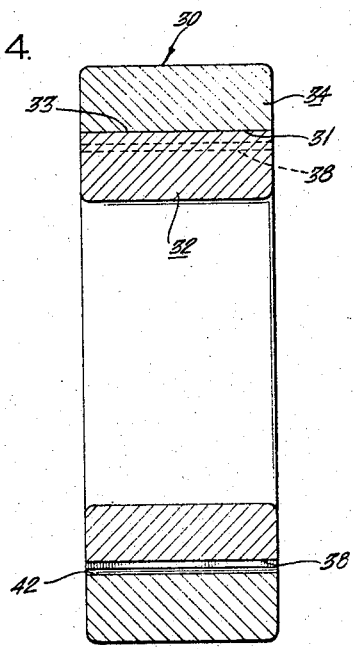
FIG. 4 is a sectional view taken on lines 4—4 of FIG. 3.

Another embodiment of elastohydrodynamic sliding bearing in accordance with the present invention is illustrated in FIGS. 3 and 4. This assembly is designated generally by the numeral 30 and comprises inner and outer rings 32 and 34 respectively having confronting bearing surfaces 31 and 33. The surface 31 of the inner ring 32 is formed with a plurality of circumferentially spaced, arcuate surfaces 36 which, as illustrated are separated by a plurality of axially extending grooves 38. In the present instance, the arcuate surfaces 36 are defined by axial portions of a cylinder 39, each portion 39 having an axially extending crown line 41 which may be straight or slightly convex defining an axially extending contact zone 43 with the surface 33 of the outer ring. The inner ring bearing surface 33 of the outer ring 34 is an uninterrupted cylindrical surface. The radius of curvature $R_3$ of each of the arcuate segments 36 is less than the radius of curvature $R_4$ of cylinder 39. By this arrangement when the rings are rotated relative to one another above a predetermined velocity, and when a predetermined load is applied in a predetermined range, the line contact zones 43 deform into a plurality of very small, but distinct, contact areas and permit a load-carrying elastohydrodynamic film to form between the rings, thus supporting the rings for relative rotation.

Still another form of elastohydrodynamic sliding bearing assembly in accordance with the present invention is illustrated in FIGS. 5–11. The bearing assembly also comprises inner and outer rings 50 and 52 respectively which have confronting bearing surfaces 51 and 53 respectively. The bearing surface 51 of the inner ring has a plurality of convex helical surfaces 54 which extend angularly relative to the plane P transverse to the central axis of the ring and which, as illustrated, are separated by a plurality of circumferentially spaced, angularly directed grooves 56. As best illustrated in the fragmentary views, FIGS. 8 and 9, each of the projections is of circular or other convex cross section. The bearing surface 53 of the outer ring is defined by a plurality of helical surfaces 58 separated by grooves 58a. The surface 58 and grooves 58a are disposed at an angle to the plane T transverse to the central axis of the ring. The radius of curvature $R_5$ of the helical surface 54 is smaller than the radius of curvature $R_6$ of the helical surfaces 58. The direction of the helical surfaces 54 and the helical surfaces 58 are opposed, as illustrated so that in the assembled relation, the crown line 54c of the helical surfaces 54 is angularly disposed to the crown line 58c of the helical surfaces 58 whereby upon relative rotation of the rings, the contact zone 59 along the crown line moves axially relative to the rings. The spacing between adjacent helical surfaces on both rings and their helix angles are so selected that a contact zone is established at one end of the bearing at the time or before the corresponding contact zone reaches the opposite end of the bearing in the course of its axial motion. By this arrangement, and by reason of the angular relationship of the crown lines of the helical bearing surfaces as the rings rotate relative to one another, there is not only a circumferential sliding velocity component in the contact zones, but also an axial entrainment velocity component in the contact zone. Sliding velocity is a differential velocity between the relatively moving surfaces and entrainment velocity is a cumulative velocity of said relatively moving surfaces. Only the sliding velocity component develops friction, but both it and the entrainment velocity component develop film thickness. The angular relationship of the helical surfaces to the bearing axis is preferably small, that is, less than 45° whereby the entrainment velocity component is greater than the sliding velocity component so that there is comparatively small development of friction and high development of film thickness. This type of bearing will function as an elastohydrodynamic bearing at particularly low speeds.

A similar configuration can be constructed using basically conical, spherical or plane surfaces or combinations of these instead of cylindrical surfaces on which the helices are superimposed, thereby producing a bearing which carries radial combined or thrust loads and is either angularly rigid or self aligning. It is noted that any other surface of rotation can also serve as a base surface provided that suitable provisions are made to permit assembly of the bearing.

Still other embodiments of elastohydrodynamic sliding bearing in accordance with the present invention are illustrated in FIGS. 12 and 13. As illustrated in FIG. 12, the assembly includes a rotating member 60, for example a shaft, and a stationary member 62 having a generally annular face 64 confronting the axial end of the shaft member 60. The stationary member 62 has a central raised hub portion 66 and in the space between the face 64 and the axial end of the member 60 there is mounted a plurality of slugs 68 having spherical or otherwise convex end faces 70 confronting the member 60 and the face 64 of the member 62 respectively which engage the rotating member 60 and the face 64 of the stationary member 62 at contact zones 67 and 69 respectively. These slugs 68 can be maintained in predetermined spaced apart relation by means of a cage member 74 if desired.

This configuration is particularly convenient and economical to manufacture because both shaft and support plate have plane surfaces, and provides a pure thrust bearing which will not suffer interference from radial shaft loads.

The bearing arrangement shown in FIG. 14 is similar to that shown in FIG. 12 and comprises a rotating member 80 and a stationary member 82. However, in the present instance the axial end face of the member 80 is provided with a conical portion 84 and the stationary member 82 has a circumferentially extending raised lip 86 adjacent its outer periphery defining an annular shoulder 87. A plurality of slugs having spherical or otherwise convex faces engage between the conical face 84, shoulder 87 and the face 83 of the stationary member 82 at contact zones 85 and 89 respectively and are spaced by a cage. If desired this assembly has a self-centering ability and also has the advantage over the previous embodiment that the slugs spin while the bearing rotates, thereby eliminating the formation of wear spots during startup.

The bearing assembly shown in FIGS. 17 and 18 is similar to that shown in FIGS. 12 and 13 and comprises a rotating member 90 having a flat axial end face 94 and a stationary member 92 having an annular face 96 confronting the axial end face of the member 90 and also having a central raised hub portion 97. However, in this embodiment the slugs 98 are doughnut shaped and engage the rotating member 90 and stationary member 92 at contact zones 93 and 95 respectively. The slugs can be maintained in predetermined spaced apart relation by means of a cage member 99 if desired. This embodiment provides line contact between slugs and bearing surfaces at the contact zones and provides a pure thrust bearing without radial load interference.

In the bearing arrangements illustrated in FIGS. 17 and 18 when the rotating member is rotated at a predetermined velocity and when it engages against the slugs, the contact zones between the slugs, the rotating member and the stationary member deform according to Hertzian law into very small, but distinct contact areas, and an elastohydrodynamic film forms which supports the members for relative rotation.

Illustrated in FIGS. 19, 20 and 21 is another embodiment of elastohydrodynamic sliding bearing in accordance with the present invention. The bearing assembly is generally designated by the numeral 100 and comprises inner and outer rings 102 and 104 respectively having confronting spaced apart faces 103 and 105 defining an annular space 107 therebetween to receive a plurality of slug members 106. If desired, a cage may be provided to space the slugs 106. As best ilustrated in FIG. 20, the outer ring 104 has at each axial end an inwardly directed lip or flange 109 defining a shoulder 111 limiting axial movement of the slugs 106. As illustrated, the face 105 of the outer ring is arcuate and convex in cross section for its entire circumferential extent. The face 103 of the inner ring is also arcuate and convex in cross section.

The external surface of each slug 107 is a portion of a circular cylinder, with radius smaller than that of the surface 105. The internal surfaces of the slug 107 is a portion of a circular cylinder, with radius larger than that of the surface 103. The combination of the slugs with the rings produces point contact zones 113 and 115 with each other.

Another embodiment of elastohydrodynamic sliding bearing in accordance with the present invention is illustrated in FIGS. 23 and 24. The bearing illustrated is a self-aligning bearing and comprises inner and outer members, in the present instance, inner and outer rings 120 and 122 respectively having confronting bearing surfaces 124 and 126. In the present instance, the outer ring 122 has a circumferentially extending spherical bearing surface 126 having a radius of curvature $R_8$. The surface 124 of the inner ring 120 is formed with a plurality of circumferentialy spaced arcuate surfaces 128 which, as illustrated, are separated by a plurality of axially extending grooves 130. In the present instance, the arcuate surfaces 128 of the inner ring are in the form of spherical or otherwise convex segments 132 defining a plurality of circumferentially spaced contact areas or zones 134 between the rings. The radius (or radii) of curvature $R_9$ of the segments 132 is (are) small enough so that the pressure at the contact areas is sufficiently large so that the lubricant film developed between the inner and outer rings of the contact zones is elastohydrodynamic. The radius of curvature $R_9$ at the apex of each of the segments 132 is less than the radus of curvature $R_8$ of the spherical bearing surfaces of the outer ring. For assembly purposes, the outer ring 122 comprises a pair of semi-annular members connected together by suitable fastening means 136.

Still another embodiment of elastohydrodynamic sliding bearing in accordance with the present invention is illustrated in FIGS. 25 and 26. This assembly is designated generally by the numeral 150 and comprises inner and outer members, in the present instance inner and outer rings 152 and 154 respectively having confronting bearing surfaces 155 and 156. In the embodiment illustrated, the outer ring 154 has a spherical bearing surface 156 having a radius of curvature $R_{11}$. The bearing surface of the inner ring is formed with a plurality of circumferentially spaced, radially outwardly directed arcuate surfaces 160 which, as illustrated, are separated by a plurality of circumferentially spaced grooves 162. The center C of the radius of curvature $R_{11}$ of the bearing surface of the outer ring is displaced axially from the geometric center of the bearing and to one side of a plane L through the contact areas or zones 164 of the bearing surfaces. In the present instance the arcuate surfaces 160 comprise portions 167 of a convex surface of revolution, each portion having principal radii at the contact zone 164 smaller than the radius of curvature $R_{11}$ of the spherical bearing surfaces 156 of the outer ring. Further, a surface S through the base of all the portions 167 describes a frusto-conical shape.

While particular embodiments of the present invention have been illustrated and described herein, it is not intended to limit the invention and changes and modifications may be made therein within the scope of the following claims.

I claim:

1. A bearing comprising first and second relatively movable members having intercontacting bearing surfaces, at least one of said bearing surfaces having a plurality of arcuate segments defining contact zones, a lubricant between the bearing surfaces, said lubricant forming a load-carrying uninterrupted elastohydrodynamic lubricant film between the bearing members at the contact zones at a predetermined range of rate of relative sliding movement of said members and at a predetermined range of loads thereby providing a fluid film-supported sliding bearing, said elastohydrodynamic film being formed when the range of certain variables is approximately in accordance with the following formulas:

$$\frac{G^{1.6}V^{0.7}}{L^{0.13}} \geq 1.5 \frac{\sigma}{R_c}$$

$$\frac{V}{L^2 G^{1.7}} \leq 10^7$$

where G=the material parameter, V=dimensionless entrainment velocity of the relatively moving bearing surfaces, L=dimensionless load, $\sigma$=composite surface roughness of the bearing surfaces, $R_c$=the equivalent radii of the contacting bearing surfaces.

2. A bearing comprising inner and outer rings having confronting bearing surfaces, the bearing surface of one of said rings being generally cylindrical, the bearing surface of the other ring having a plurality of circumferentially spaced, radially directed projections in the form of spherical or otherwise convex segments defining contact zones engaging the bearing surface of the other ring, a plurality of axially extending grooves separating the spherical segments, a lubricant between the bearing surfaces, said lubricant forming a load-carrying uninterrupted elastohydrodynamic lubricant film between the rings at the contact zones at a predetermined range of rate of relative sliding movement of the rings and a predetermined range of loads providing a fluid film-supported sliding bearing, said elastohydrodynamic film being formed when the range of certain variables is approximately in accordance with the following formulas:

$$\frac{G^{1.6}V^{0.7}}{L^{0.13}} \geq 1.5 \frac{\sigma}{R_c}$$

$$\frac{V}{L^2 G^{1.7}} \leq 10^7$$

where G=the material parameter, V=dimensionless entrainment velocity of the relatively moving bearing surfaces, L=dimensionless load, $\sigma$=composite surface roughness of the bearing surfaces, $R_c$=the equivalent radii of the contacting bearing surfaces.

3. A bearing as claimed in claim 2 wherein the spherical segments project radially outwardly from the bearing surface of the inner ring.

4. A bearing comprising inner and outer relatively slidable members having confronting circumferentially extending bearing surfaces, the bearing surfaces of one of said members having a plurality of circumferentially spaced arcuate projections defined by axial portions of a cylinder and separated by a plurality of axially extending grooves, the bearing surface of the other member having a smooth cylindrical surface, axial portions of the cylinder having a different radius than the cylindrical surface, a lubricant between the bearing surfaces which forms a load-carrying uninterrupted elastohydrodynamic film at the contact zones at a predetermined range of rate of relative sliding movement of the rings and at a predetermined range of loads thereby providing a fluid film-supported sliding bearing, said elastohydrodynamic film being formed when the range of certain variables is approximately in accordance with the following formulas:

$$\frac{G^{1.6}V^{0.7}}{L^{0.13}} \geq 1.5\frac{\sigma}{R_c}$$

$$\frac{V}{L^2G^{1.7}} \leq 10^7$$

where G=the material parameter, V=dimensionless entrainment velocity of the relatively moving bearing surface, L=dimensionless load, σ=composite surface roughness of the bearing surfaces, $R_c$=the equivalent radii of the contacting bearing surfaces.

5. A bearing comprising first and second relatively movable members having intercontacting bearing surfaces, one of said bearing surfaces being formed with a plurality of circumferentially spaced, spherical segments defining contact zones, the other bearing surface being spherical, the radius of curvature of the segments being smaller than the radius of curvature of the other spherical bearing surface, a lubricant between the bearing surfaces, said lubricant forming a load-carrying uninterrupted elastohydrodynamic lubricant film between the bearing members at the contact zones at a predetermined range of rate of relative sliding movement of said members and at a predetermined range of loads thereby providing a fluid film-supported sliding bearing, said elastohydrodynamic film being formed when the range of certain variables is approximately in accordance with the following formulas;

$$\frac{G^{1.6}V^{0.7}}{L^{0.13}} \geq 1.5\frac{\sigma}{R_c}$$

$$\frac{v}{L^2G^{1.7}} \leq 10^7$$

where G=the material parameter, V=dimensionless entrainment velocity of the relatively moving bearing surfaces, L=dimensionless load, σ=composite surface roughness of the bearing surfaces, $R_c$=the equivalent radii of the contacting bearing surfaces.

6. A bearing comprising first and second relatively movable members having intercontacting bearing surfaces, one of said bearing surfaces having a plurality of arcuate projections defining cutout zones, each projection being defined by a convex surface of revolution, the other bearing surface being spherical having a radius of curvature with its center displaced axially from the geometrical center of the bearing and to one side of a plane through the contact zones, the principal radii of each convex surface of revolution being smaller than the radius of curvature of said other spherical bearing surface, a lubricant between said bearing surfaces, said lubricant forming a load-carrying uninterrupted elastohydrodynamic lubricant film between the bearing members at the contact zones at a predetermined range of rate of relative sliding movement of said members and at a predetermined range of loads thereby providing a fluid film-supported sliding bearing, said elastohydrodynamic film being formed when the range of certain variables is approximately in accordance with the following formulas;

$$\frac{G^{1.6}V^{0.7}}{L^{0.13}} \geq 1.5\frac{\sigma}{R_c}$$

$$\frac{v}{L^2G^{1.7}} \leq 10^7$$

where G=the material parameter, V=dimensionless entrainment velocity of the relatively moving bearing surfaces, L=dimensionless load, σ=composite surface roughness of the bearing surfaces, $R_c$=the equivalent radii of the contacting bearing surfaces.

7. A bearing comprising first and second relatively movable members having intercontacting bearing surfaces, at least one of said bearing surfaces having a plurality of arcuate sections defining contact zones, a lubricant between the bearing surfaces and means for moving the bearing members relative to one another whereby the bearing surfaces slide relative to one another while being in pressure-applying relation whereby at a predetermined range of rate of relative sliding movement of the members and at a predetermined range of loads, a load-carrying uninterrupted elastohydrodynamic lubricant film is formed between the elastically deformed contacting surfaces of the bearing members providing a fluid film-supported sliding bearing, said elastohydrodynamic film being formed when the range of certain variables is approximately in accordance with the following formulas;

$$\frac{G^{1.6}V^{0.7}}{L^{0.13}} \geq 1.5\frac{\sigma}{R_c}$$

$$\frac{v}{L^2G^{1.7}} \leq 10^7$$

where G=the material parameter, V=dimensionless entrainment velocity of the relatively moving bearing surfaces, L=dimensionless load, σ=composite surface roughness of the bearing surfaces, $R_c$=the equivalent radii of the contacting bearing surfaces.

8. A bearing comprising first and second relatively movable members having intercontacting bearing surfaces, at least one of said bearing surfaces having a plurality of arcuate sections defining contact zones, a lubricant between the bearing surfaces and means for moving the bearing members relative to one another while being in pressure-applying relation whereby within a predetermined range of entrainment velocities (V) of the members moving through the contact zones and within a predetermined range of loads (L) and contact curvatures ($R_c$), a load-carrying uninterrupted elastohydrodynamic lubricant film is formed between the elastically deformed contacting surfaces of the bearing members providing a fluid film-supported sliding bearing, said elastohydrodynamic film being formed when the range of certain variables is approximately in accordance with the following formulas;

$$\frac{G^{1.6}V^{0.7}}{L^{0.13}} \geq 1.5\frac{\sigma}{R_c}$$

$$\frac{v}{L^2G^{1.7}} \leq 10^7$$

where G=the material parameter, V=dimensionless entrainment velocity of the relatively moving bearing surfaces, L=dimensionless load, σ=composite surface roughness of the bearing surfaces, $R_c$=the equivalent radii of the contacting bearing surfaces.

No references cited.

MARTIN P. SCHWADRON, *Primary Examiner.*

FRANK SUSKO, *Assistant Examiner.*